(12) United States Patent
Joshi et al.

(10) Patent No.: US 8,777,050 B1
(45) Date of Patent: Jul. 15, 2014

(54) VENT ASSEMBLY FOR COLLAPSIBLE STORAGE TANK

(71) Applicant: GTA Containers, Inc., South Bend, IN (US)

(72) Inventors: Yatish J. Joshi, South Bend, IN (US); Simon T. Addicott, Mishawaka, IN (US)

(73) Assignee: GTA Containers, Inc., South Bend, IN (US)

( * ) Notice: Subject to any disclaimer, the term of this patent is extended or adjusted under 35 U.S.C. 154(b) by 0 days.

(21) Appl. No.: 13/865,635

(22) Filed: Apr. 18, 2013

Related U.S. Application Data

(60) Provisional application No. 61/625,833, filed on Apr. 18, 2012.

(51) Int. Cl.
*B65D 90/34* (2006.01)
*B65D 21/08* (2006.01)
*F16K 17/19* (2006.01)

(52) U.S. Cl.
CPC ............... *B65D 90/34* (2013.01); *F16K 17/19* (2013.01); *B65D 21/086* (2013.01)
USPC .......................................... 220/745; 220/666

(58) Field of Classification Search
CPC ....... B65D 21/086; B65D 90/34; F16K 17/19
USPC .............. 220/745, 601, 6, 666, 582, 294, 293
See application file for complete search history.

(56) References Cited

U.S. PATENT DOCUMENTS

| | | | |
|---|---|---|---|
| 2,724,418 A | 11/1955 | Krupp | |
| 3,074,837 A * | 1/1963 | Valer | 156/69 |
| 3,510,142 A | 5/1970 | Erke | |
| 4,865,096 A | 9/1989 | Schober et al. | |
| 4,875,596 A | 10/1989 | Lohse | |
| 6,186,713 B1 | 2/2001 | Bonerb | |
| 6,842,955 B2 | 1/2005 | Joshi et al. | |
| 7,717,296 B1 | 5/2010 | Guthrie | |
| 2009/0001085 A1 | 1/2009 | Bartz et al. | |

* cited by examiner

*Primary Examiner* — Robert J Hicks
(74) *Attorney, Agent, or Firm* — Faegre Baker Daniels, LLP

(57) ABSTRACT

In one embodiment, a vent assembly for mounting on a collapsible storage tank is provided including a flange member having a central hub, and a flange extending outwardly from the central hub; a top sealing layer of flexible fabric having a hole for receiving the central hub and mounted at least partially over the flange and extending outwardly beyond the flange; an intermediate sealing layer of flexible fabric having a hole aligned with the opening in the hub and mounted beneath the flange and extending outwardly there beyond and bonded to the top sealing layer beyond the flange; and a wall of the collapsible storage tank formed from flexible fabric material, the intermediate sealing layer bonded to the wall.

9 Claims, 5 Drawing Sheets

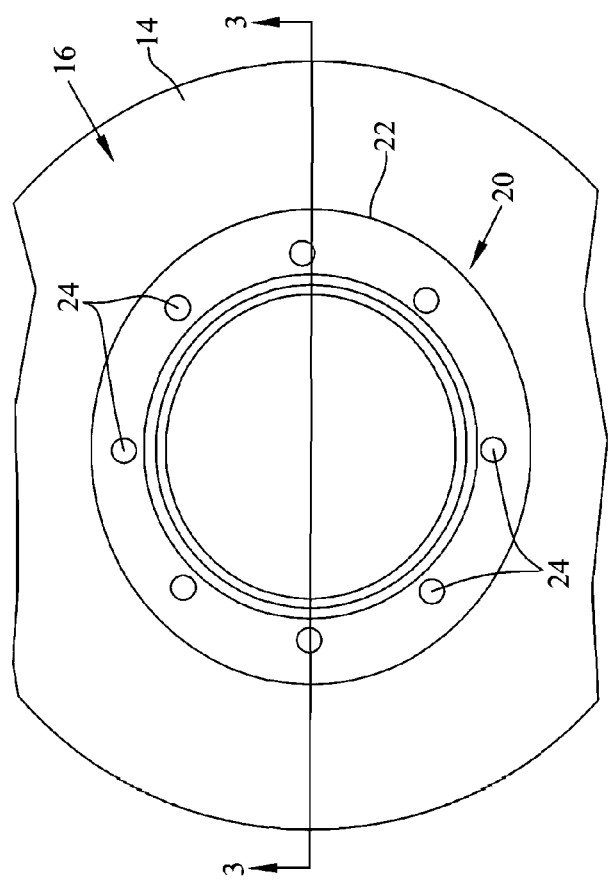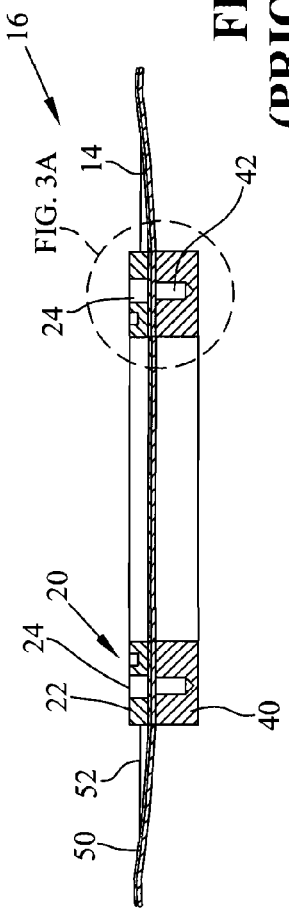

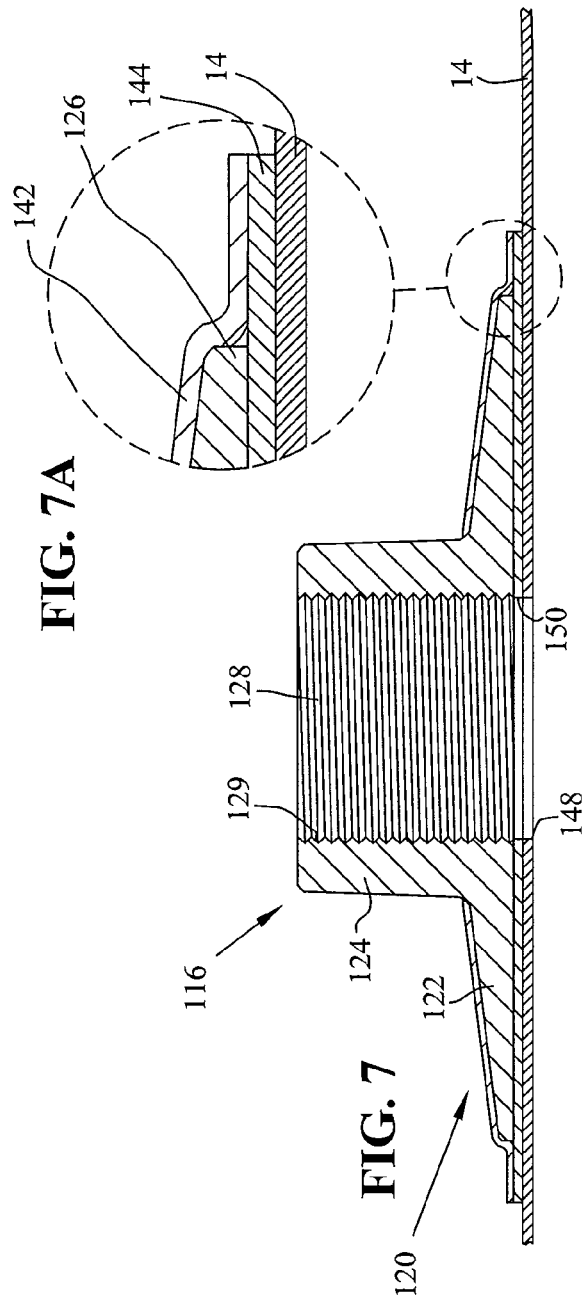

VENT ASSEMBLY FOR COLLAPSIBLE STORAGE TANK

This application claims the benefit of U.S. Provisional Patent Application Ser. No. 61/625,833 filed Apr. 18, 2012, the complete disclosure of which is hereby expressly incorporated by reference.

BACKGROUND OF THE INVENTION

This invention relates to a vent assembly for collapsible, flexible storage tanks; and in particular, to a vent assembly having an alternate attachment system for attachment to the tank and reduced mass and weight over prior art vents.

It is often desirable to have a container storage tank capable of holding a liquid such that when there is no liquid in the container, it may be collapsed or folded for ease of transportation and storage. Collapsible liquid containers have been available for some time and encompass a variety of designs. Also, it is common to provide a vent fixture or release valve in the collapsible storage tank to allow vapor and pressure that build up in the tank due to heat or agitation to be vented therefrom. This is of particular concern for collapsible storage tanks used to hold volatile fuel as the pressures and vapors contained in the tank may cause danger of explosion and/or fire if allowed to collect in the tank. Accordingly, allowing such vapors and pressure to vent is of prime importance.

One example of an early collapsible container of the pillow tank variety is found in U.S. Pat. No. 2,724,418 to Krupp, which is incorporated in its entirety herein by reference. Krupp discloses a flexible container that includes a volume responsive pressure relief valve and overflow valve assembly. In the Krupp disclosure, the pressure relief valve/vent is located in the middle and top of the tank. This is common in prior art tanks, as the top middle area tends to be the highest point and the location where gas, vapors, and pressure would rise to and presumably collect or be evacuated out of the pressure relief vent. In addition, the tank in Krupp includes a connector fitting, an attachable cap fitting for filling a drain in a tank. The tank also includes attached flexible handles. The containers are made from a flexible sheet material having an intermediate layer or a plurality thereof of square-woven textile fabric sheet material of cotton, nylon, rayon, glass fibers or other suitable filamentary material having the desired strength characteristics. The material is coated or treated with a suitable natural or synthetic rubber composition. The material may also include an outer protective layer of suitable rubber composition having age resisting and abrasion resisting characteristics, an inner layer of gasoline resistant rubber compositions, such as, for example, a copolymer of butadiene and acrylonitrile or a neoprene. The container is assembled by joining and adhering in a suitable known manner, including a plurality of pre-cut patterns of suitable flexible sheet material. The materials are joined in laterally extending seams of overlapped, fabric tape reinforced construction.

Another form of flexible container is found in U.S. Pat. No. 3,510,142 to Erke, which is incorporated in its entirety herein by reference. Erke discloses a portable, collapsible tank having an inflatable double walled construction with tie down means secured thereto. The tank in Erke has a double walled inflatable structure with one or more fill/drain ports. The tank is designed to receive and retain a variety of liquids or dry powder materials.

Another pillow tank is disclosed in U.S. Pat. No. 4,865,096 to Schober et al., which is incorporated in its entirety herein by reference. Schober et al. discloses a pillow tank with upper and lower sections, which are secured together along a seam extending around the mid section of the tank. A sleeve extends along a mid line of the entire perimeter of the seam. Slits or holes are formed through the sleeve to permit a rope to be threaded through portions of the sleeve to form tie-down points for the tank. The tank may also include exterior strapping in different configurations that can be sewn or secured to the tank for added strength. The tank is formed of a tube defined by an upper rectangular section and a lower rectangular section bonded together. Material for the tank may be typical elastomeric coated cloth panels, which may be square woven nylon cloth with a coating of neoprene or SBR rubber. Typical nylon cloth weights in a tank would be 5 and 13 ounces per square yard, although other weave patterns of nylon cloth can be used. Elastic coated aramid fibers may also be suitable material for manufacturing the tank.

Another flexible container is disclosed in U.S. Pat. No. 4,875,596 to Lohse, which is incorporated in its entirety herein by reference. The vessel in Lohse is designed for transporting or storing bulk materials or liquids and is shaped in the form of a tube having open ends tightly sealed by means of a straight line clamp or connection parts. The clamp connection parts are formed toothed rack-like so that, with relatively short clamp connections, tubes with relatively large openings can be sealed tightly.

U.S. Pat. No. 6,186,713 B1 to Bonerb discloses a bulk liquid freight transport vehicle, which is incorporated in its entirety herein by reference. The transport includes a collapsible liquid cargo bag and at least one adjustable cinching strap for being tightened down over the bag. Tightening of the strap over the bag causes the pressure of the liquid mass within the bag to increase to prevent motion of the liquid in the bag through motion of the vehicle.

A different type of flexible storage tank is disclosed in U.S. Pat. No. 6,842,955 B2 to Joshi et al., which is incorporated in its entirety herein by reference. The tank disclosed by Joshi et al. has a frusto-conical sidewall configuration and an open top. The tank is constructed of a material such as DuPont Elvaloy™, which is an ethylene-based polymer with reinforced synthetic fibers. Sections of the tank are joined using a heat sealing technique, such as radio frequency welding, ultrasonic heating, heating with hot air, electrical resistant heat, or other methods.

U.S. Patent Application Publication No. US 2009/0001085 A1 to Bartz et al. discloses a flexible tank, which is incorporated in its entirety herein by reference. The tank in Bartz et al. includes an internal baffle apparatus comprising a plurality of panel members connected along a connection line that defines an axis. Panel members extend in a diagonal fashion towards corners of the tank and also extending vertically between the top and bottom of the tank.

U.S. Pat. No. 7,717,296 B1 to Guthrie discloses a transportable and collapsible fabric tank with an integral balloon baffle system, which is incorporated in its entirety herein by reference. The tank in Guthrie is made from a fabric-composite-based material impregnated with polytetrafluoroethylene (PTFE). The internal baffles aid in the stability of the tank to prevent sloshing of the liquid while traveling with the tank partially filled. Internal baffles inflate to sizes large enough to force liquids out of the tank through the discharge valve.

One of the problems with prior art pressure relief and vent valves or fittings is that the assembly consisted of several members of substantial weight, and typically manufactured from metal. The members are held together with fasteners. The majority of the vent assembly was located external to the tank and tank material; however, typically there is also an internal portion of considerable overweight, such as is found in the patent to Krupp.

Accordingly, the weight of the vent or pressure relief assembly can cause tearing of the fabric material forming the wall of the tank in the area where it is attached. Additionally, the tank will have a tendency to sag in the area where the vent assembly is located based upon the weight of the assembly. Sagging can result in a small depression or concave area around the vent assembly. This concave area can collect moisture from rain, snow, and dew. As the concave area collects water, this further increases the weight around the vent assembly, causing an even greater depression and concave area. As should be appreciated, the weight and depression around a vent assembly can become quite significant.

In addition to the increased propensity for tearing around the valve assembly, the depression in concave area also prohibits all the gas and vapor pressure from being released through the vent assembly. Rather, the gas and vapor pressure can collect in an area around the vent assembly that becomes higher than the concave area associated with depression. As such, gas and vapors collect in a donut-shaped configuration around the vent assembly. These collected gas and pressurized vapors can present hazards and concerns as discussed above.

Accordingly, it is an object of the present invention to provide a vent assembly for a collapsible, flexible tank having less mass and weight than typical prior art assemblies to prevent sagging and tearing around the vent assembly. It is a further object of the invention to reduce the likelihood of tearing of the fabric around the weighted vent assembly. It is a further object of the invention to provide a vent assembly that reduces any concave depression around the vent assembly to prevent or reduce the amount of additional weight from accumulated water and moisture. These and other objects of the invention are encompassed in the invention and body of which is described in the detailed description and shown in the drawings.

SUMMARY OF THE INVENTION

In one embodiment of the invention, a vent assembly for mounting on a collapsible storage tank is provided including a flange member having a central hub, and a flange extending outwardly from the central hub; a top sealing layer of flexible fabric having a hole for receiving the central hub and mounted at least partially over the flange and extending outwardly beyond the flange; an intermediate sealing layer of flexible fabric having a hole aligned with the opening in the hub and mounted beneath the flange and extending outwardly there beyond and bonded to the top sealing layer beyond the flange; and a wall of the collapsible storage tank formed from flexible fabric material, the intermediate sealing layer bonded to the wall.

The vent assembly may have a flange that has an oval configuration. The flange may have a tapered thickness being thickest adjacent the central hub and thinnest along an outer end. The central hub may have an opening extending therethrough, and the opening through the central hub can be threaded. The opening through the central hub may extend generally perpendicular to the flange, the top sealing layer and intermediate sealing layer can have a circular configuration. The bond between the top sealing layer and the intermediate sealing layer can be wider adjacent a narrower portion of the flange as determined by the oval configuration than adjacent a wider portion of the flange.

In another embodiment of the invention, a method of attaching a vent assembly to a collapsible storage tank is provided. The method includes the steps of providing a flange member having a flange portion with an outer end extending thereabout and a central hub extending upward from the flange portion; providing a top sealing layer of flexible fabric material; providing an intermediate sealing layer of flexible fabric material; providing a wall of flexible fabric material on the collapsible storage tank; bonding at least a portion of the top sealing layer to the intermediate sealing layer beyond the outer end of the flange portion to form a seal therebetween; and bonding the intermediate layer to the wall.

The method may include the step of cutting a hole in the top sealing layer and may further include the step of placing the central hub through the hole in the top sealing layer. The method may also include the step of providing a threaded opening through the central hub. The threaded opening through the central hub may extend generally perpendicular to the flange portion.

The method may also include the step of cutting a hole through the intermediate layer and the wall, and the holes in the intermediate layer and the wall can be aligned with the opening through the central hub.

At least one of the bonding steps can be accomplished with a chemical bonding agent, and/or at least one of the bonding steps can be accomplished with a fusion bond from heating the flexible fabric material.

In another embodiment of the invention, a method of attaching a vent assembly to a collapsible storage tank is provided, including the steps of providing a flange member having a flange portion with an outer end extending thereabout and a central hub extending upward from the flange portion; providing a top sealing layer of flexible fabric material; providing an intermediate sealing layer of flexible fabric material; providing a wall of flexible fabric material on the collapsible storage tank; cutting a hole in the top sealing layer configured to receive the central hub; placing the central hub through the hole in the top sealing layer; and bonding at least a portion of the top sealing layer to the intermediate sealing layer beyond the outer end of the flange portion to form a seal therebetween.

The method may include the step of bonding at least a portion of one of the top sealing layers or intermediate sealing layer to the flange portion using a chemical bonding agent, and further may include the step of bonding the intermediate sealing layer to the wall.

The method may further include the steps of providing a threaded opening through the central hub and providing holes in the intermediate sealing layer and wall aligned with the opening in the central hub.

In another embodiment of the invention, a vent assembly for mounting on a collapsible storage tank is provided including a flange member having a hub, a bore extending through the hub, and a flange extending outwardly from the hub; a top sealing layer of flexible fabric having a hole aligned with the bore through the flange member and mounted at least partially over the flange and extending outwardly beyond the flange; and a wall of the collapsible storage tank formed from flexible fabric material, the wall being directly or indirectly bonded to the top sealing layer where the top sealing layer extends beyond the flange.

BRIEF DESCRIPTION OF THE DRAWINGS

The above-mentioned and other features and objects of this invention and the manner of obtaining them will become more apparent and the invention itself will be better understood by reference to the following description of embodiments of the present invention taken in conjunction with the accompanying drawings, wherein:

FIG. 2 is a plan view of the vent assembly on the tank of FIG. 1 showing the vent assembly mounted to the wall of the collapsible tank;

FIG. 3 is a cross section of the vent assembly of FIG. 2 taken along lines 3-3;

FIG. 7 is a cross sectional view of the vent and mounting layers as assembled together and mounted on the wall of a collapsible tank; and FIG. 7A is an enlarged view in the area indicated in FIG. 7 of the mounting layers joined around the edge of the flange.

Figure 1:
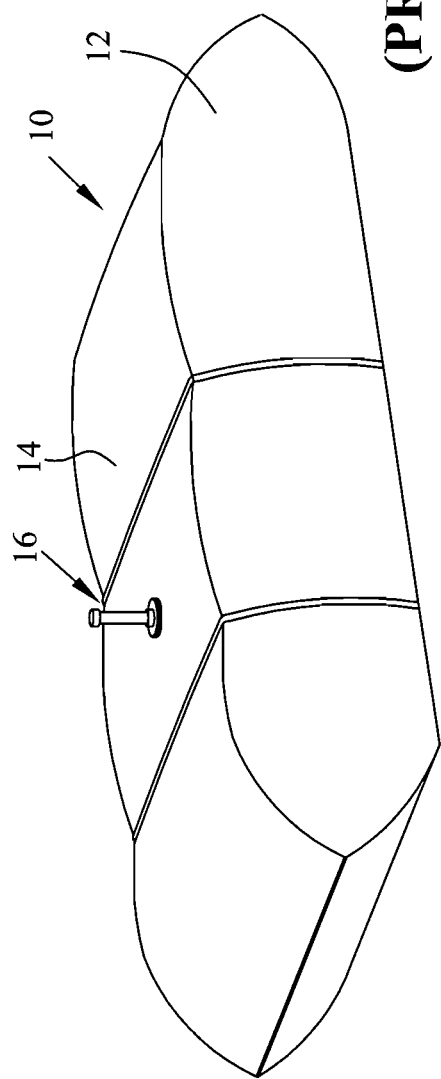
FIG. 1 is a perspective view of one embodiment of a prior art collapsible tank and vent assembly.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF EMBODIMENTS OF THE INVENTION

For the purposes of promoting an understanding of the principles of the invention, reference will now be made to the embodiments illustrated in the drawings, which are described below. It will nevertheless be understood that no limitation of the scope of the invention is thereby intended. The invention includes any alterations and further modifications in the illustrated devices and described methods and further applications of the principles of the invention, which would normally occur to one skilled in the art to which the invention relates.

Now referring to FIG. 1, one embodiment of a collapsible storage tank is shown, generally indicated as 10. Storage tank 10 is manufactured with known art and includes walls 12 made of a flexible fabric material as is known. Walls 12 include an upper or top side 14, wherein a prior art vent assembly, generally indicated as 16, is mounted in approximately the middle thereof.

Figure 3A:
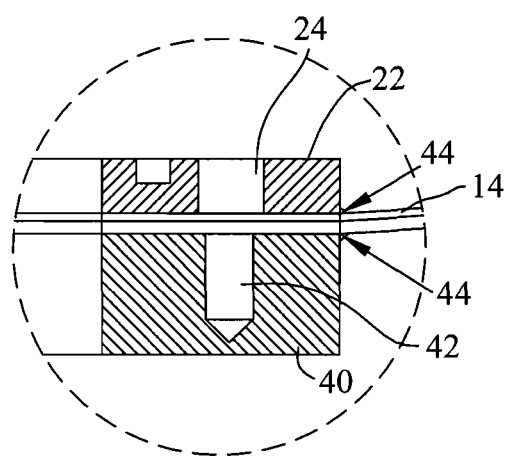
FIG. 3A is an enlarged view of the area indicated in FIG. 3.

Now referring to FIGS. 2, 3, and 3A, details of prior art vent assembly 16 are shown. Vent assembly 16 includes an upper member, generally indicated as 20, having a circular horizontal flange 22, which may have a valve (not shown) attached thereto, as is known, in a pathway for gases or fumes from tank 10 to escape to the atmosphere. Flange 22 includes throughholes 24 for receiving a plurality of fasteners (not shown), as is known, therethrough. The fasteners may include bolts, washers, and lock washers.

Vent assembly 16 also includes a lower member 40 that also has a generally circular disc-shaped configuration. Flange 22 and lower member 40 may all have the same diameter as shown in FIGS. 2 and 3, but may also have different diameters. Lower member 40 also includes holes 42 for receiving fasteners extending through and from holes 24.

Vent assembly 16 further includes fillets, with one located between flange 22 and top side 14, and the other located between lower member 40 and the underside of top 14. Fillets 44 may be made from a resilient gum, or pliable material as is known to perform a sealing function. Also, as shown in FIG. 3, top side 14 of wall 12 may be of double thickness or reinforced where vent assembly 16 is mounted.

As discussed above, the weight of vent assembly 16 may cause sagging in the top side wall 14, as shown in FIG. 3, creating a concave depression, generally indicated as 50. Wall 14 may be subject to splitting or damage because of the weight of assembly 16, and in addition, concave depression 50 may further accumulate moisture 52 adding additional weight and stress around vent assembly 16. In addition, as discussed above, as wall 14, where vent assembly 16 is attached, is no longer at the highest point of collapsible storage tank 10, gas and fumes may collect in a donut-shaped configuration in the higher areas of top side 14 around vent assembly 16.

Figure 4:
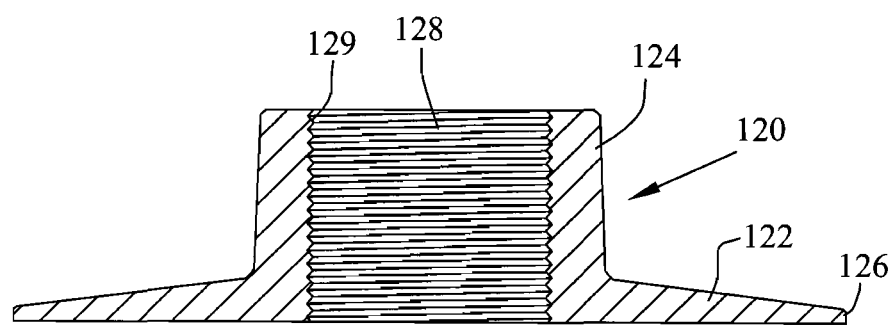
FIG. 4 is a cross section of a flange of a vent assembly in accordance with one embodiment of the present invention taken along line 4-4 of FIG. 5.
Figure 5:
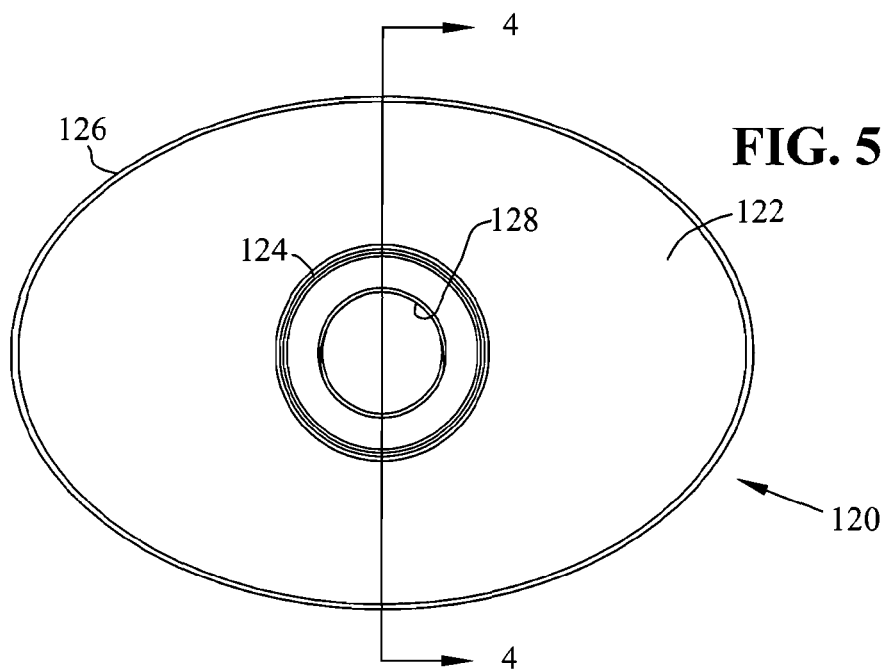
FIG. 5 is a plan view of the vent flange of FIG. 4.

Now referring to FIGS. 4-7, a vent assembly in accordance with one embodiment of the subject invention is shown, generally indicated as 116. Vent assembly 116 includes a flange member 120, as best shown in FIGS. 4 and 5, a top sealing layer 142, and an intermediate sealing layer 144 (see FIGS. 6, 7, and 7A). Flange member 120 includes a flange or flange portion 122 and a hub 124 extending upward from flange 122. Flange member 116 may be formed from a metal such as steel, stainless steel, or aluminum or may also be manufactured from a non-metal. Flange 122 has an oval configuration in the embodiment shown and includes an outer end or periphery 126. As such, outer periphery 126 is wider along one area of the oval than the other. Furthermore, flange 122 has a tapered thickness being thickest near hub 124 and thinnest around outer end 126.

Hub 124 is located in the center of flange 122 in the embodiment shown and extends generally perpendicular thereto. Hub 124 also includes a throughbore or opening 128 that, in the embodiment shown, includes internal threads 129. Internal threads allow an upright or extension (not shown) to be attached to flange member 120 to increase the height of the vent and for inclusion of a one-way valve (not shown) as is known.

Top sealing layer 142 and intermediate sealing layer 144 can be made from a flexible fabric material, the same as or compatible with top wall 14. In the embodiment shown, top sealing layer 142 and intermediate sealing layer 144 have a circular configuration. In addition, top sealing layer 142 includes a hole 146 sized and configured to receive hub 124.

Figure 6:
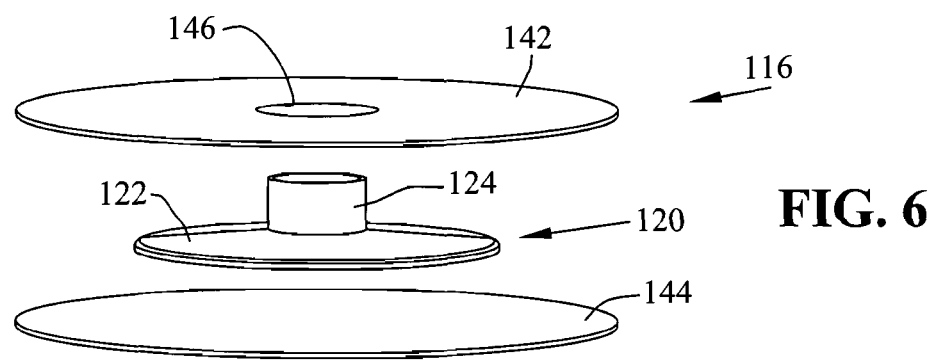
FIG. 6 is an exploded perspective view of the vent flange of FIG. 4 and assembly.

To assemble vent assembly 116, top sealing layer 142 is placed over the top of flange member 120 with hub 124 extending through hole 146 in the top sealing layer. Intermediate sealing layer 144 is placed beneath flange member 120 as shown in FIGS. 6, 7 and 7A. Then, the outer edges of top sealing layer 142 and intermediate sealing layer 144 are bonded together where the layers extend beyond outer end 126 of flange 122. The bond may be made using any well known technique for producing heat such as radiofrequency welding, ultrasonic welding, heating with hot air or electrical resistance heating. Alternately, the bond may be a chemical bond using a chemical bonding agent such as an adhesive. Furthermore, it should be appreciated that top sealing layer 142 and/or intermediate sealing layer 144 may be secured or bonded to flange 122. This bond may be made using a chemical bonding agent or possibly a heat bond if flange member 120 is manufactured from a non metal. Intermediate sealing layer 144 is also bonded to top wall 14 of storage tank 10. This bond may be performed before or after the bond of intermediate sealing layer 144 to top sealing layer 142. Also, holes 148 and 150, respectively, are cut in top wall 14 and intermediate sealing layer 144 (to coincide with through bore 128 in flange member 120). These holes, 148 and 150, may be cut before or after the intermediate layer is bonded to top wall 14.

In operation, it should be appreciated that the vent assembly of the subject invention has considerably less weight than prior art vent assemblies, thereby, making the vent assembly less prone to tearing wall 14 and creating a concave depression like 50 to hold and trap moisture 52. Additionally, vent assembly 116 provides an excellent seal resistant to leaking and does not require any fasteners or members internal to the tank.

It should also be appreciated that the oval configuration of flange 122 helps prevent the flange from turning or rotating while threading in an upper or extension valve member into internal threads 129 of throughbore 128.

While the invention has been taught with specific reference to these embodiments, one skilled in the art will recognize that changes can be made in form and detail without departing from the spirit and scope of the invention. For instance, flange 122 may have other configurations besides oval. For instance, flange 122 could readily have a rectangular configuration. Also, it should be appreciated that in certain embodiments it may be possible to eliminate intermediate layer 144 from the vent assembly. The top sealing layer and intermediate sealing layer may have other configurations, such as oval, and additional sealing layers may be added above or below the flange member. It would also be possible to have the hub offset from the center of the flange. The described embodiments are to be considered, therefore, in all respects only as illustrative and not restrictive. As such, the scope of the invention is indicated by the following claims rather than by the description.

The invention claimed is:

1. A vent assembly and collapsible storage tank, the vent assembly mounted to the collapsible storage tank, including:
   a flange member of the vent assembly having a hub and a flange extending outwardly from the hub;
   a top sealing layer of flexible fabric having a hole for receiving the hub and mounted at least partially over the flange and extending outwardly beyond the flange;
   an intermediate sealing layer of flexible fabric having a hole aligned with the opening in the hub and mounted beneath the flange and extending outwardly there beyond and bonded to the top sealing layer beyond the flange; and
   a wall of the collapsible storage tank formed from flexible fabric material, the intermediate sealing layer bonded to the wall.

2. The vent assembly for the collapsible storage tank as set forth in claim 1, wherein the hub is located in the center of the flange.

3. The vent assembly for the collapsible storage tank as set forth in claim 2, wherein the flange has a tapered thickness being thickest adjacent the central hub and thinnest along an outer end.

4. The vent assembly for the collapsible storage tank as set forth in claim 3, wherein the central hub has an opening extending therethrough.

5. The vent assembly for the collapsible storage tank as set forth in claim 4, wherein the opening through the central hub is threaded.

6. The vent assembly for the collapsible storage tank as set forth in claim 5, wherein the opening through the central hub extends generally perpendicular to the flange.

7. The vent assembly for the collapsible storage tank as set forth in claim 6, wherein the top sealing layer and intermediate sealing layer have a circular configuration.

8. The vent assembly for the collapsible storage tank as set forth in claim 7, wherein the bond between the top sealing layer and the intermediate sealing layer is wider adjacent a narrower portion of the flange as determined by the oval configuration than adjacent a wider portion of the flange.

9. A vent assembly and collapsible storage tank, the vent assembly mounted on the collapsible storage tank, including:
   a flange member of the vent assembly having a hub, a bore extending through the hub, and a flange extending outwardly from the hub;
   a top sealing layer of flexible fabric having a hole aligned with the bore through the flange member and mounted at least partially over the flange and extending outwardly beyond the flange; and
   a wall of the collapsible storage tank formed from flexible fabric material, the wall being directly or indirectly bonded to the top sealing layer where the top sealing layer extends beyond the flange.

* * * * *